United States Patent [19]

Stielau

[11] 4,186,092
[45] Jan. 29, 1980

[54] VACUUM BELT FILTERS

[75] Inventor: Theodor M. Stielau, Sandton, South Africa

[73] Assignee: Delkor Technik (Proprietary) Limited, Randburg, South Africa

[21] Appl. No.: 933,474

[22] Filed: Aug. 14, 1978

[51] Int. Cl.² .................. B01D 33/04; B01D 33/36
[52] U.S. Cl. .................................. 210/77; 210/82; 210/395
[58] Field of Search ............... 210/77, 81, 82, 391, 210/393, 395, 400, 401; 55/242, 290, 291

[56] References Cited

U.S. PATENT DOCUMENTS

| | | | |
|---|---|---|---|
| 2,289,762 | 7/1942 | Duvall | 210/77 |
| 3,347,740 | 10/1967 | Goumeniouk | 55/290 |
| 3,433,265 | 3/1969 | Bartholet | 210/395 X |
| 3,601,039 | 8/1971 | Schover | 210/400 X |
| 3,951,805 | 4/1976 | Dodd | 210/400 X |
| 4,088,581 | 5/1978 | Carle | 210/391 |

Primary Examiner—William A. Cuchlinski, Jr.

[57] ABSTRACT

The invention provides a discharge roller for a vacuum belt filter, over which a filter cloth of the filter passes, the roller having a channelling means in the form of a plurality of longitudinally directed and circumferentially spaced-apart passages which are each in communication with a different segment of the cylindrical surface of the roller via suitable radially directed bores and an end valve for directing a discharge fluid to those passages which are in communication, at any particular time, with that portion of the cylindrical surface engaged by the filter cloth, such that there is flow of the discharge fluid in a reverse direction through the cloth to separate residue cake therefrom.

In order to ensure contact between the filter cloth and the roller the roller may be driven or the cloth may be sucked against the roller, further passages and bores being provided which are selectively connected to a suction source by a further end valve, the passages being in communication with different segments of the cylindrical surface of the roller via the bores.

A number of longitudinally directed, circumferentially spaced-apart channels may be provided in the cylindrical surface of the roller, for distributing the discharge fluid and the suction force.

19 Claims, 8 Drawing Figures

VACUUM BELT FILTERS

GENERAL DESCRIPTION OF THE INVENTION

This invention relates to a means for assisting in the discharge of residue cake from a filter cloth of a vacuum belt filter, to a vacuum belt filter having the discharge assisting means, and to a method of discharging a residue cake from a filter cloth of a vacuum belt filter.

With horizontal vacuum belt filters it is extremely difficult to induce a residue cake to part from a filter cloth of the filter when the cake is of a sticky material, the speed of the cloth around its path is greater than about 30 ft/min., or the residue cake is to be discharged some distance in front of the head roller of the filter for mechanical reasons associated with ancillary equipment such as a residue cake conveyor, repulper and the like. The result is that undischarged cake accumulates on the cloth, support rollers, and cloth washing areas, creating operational problems.

Previously filter cake has been removed by means of gravitational action or by means of a reverse roller and a scraper.

Accordingly the invention provides a means for assisting in the discharge of a residue cake from a filter cloth of a vacuum belt filter, which includes, a discharge roller over which the filter cloth may pass and which has a channelling means for channelling a discharge fluid through that portion of the filter cloth that is in engagement with it, in a reverse direction through the cloth, thereby to separate the residue cake from the cloth.

The filter is preferably a horizontal vacuum belt filter.

Further according to the invention there is provided a method of discharging a residue cake from a filter cloth of a vacuum belt filter, which includes passing the filter cloth over a discharge roller; and causing a discharge fluid to flow in a reverse direction through that portion of the filter cloth in engagement with the roller, via the roller, thereby to separate the residue cake from the filter cloth.

The channelling means may comprise a plurality of longitudinally directed and circumferentially spaced-apart passages in the roller which are each in communication with a different segment of the cylindrical surface of the roller via suitable bores; and a valve means for directing discharge fluid to those passages which are in communication, at any particular time, with that portion of the cylindrical surface engaged by the filter cloth. The passages may be open at one end and the valve means may comprise a stationary end valve with which the passages are alternately aligned upon rotation of the roller.

A plurality of longitudinally directed circumferentially spaced-apart channels may be provided in the cylindrical surface of the roller, which are in communication with the bores, for distributing the discharge fluid.

The roller is mountable for rotation about a rotational axis. The roller may be driven, suitable drive coupling means being provided. Alternatively the roller may be freely rotatable and may be rotated by frictional engagement with the moving filter cloth. In order to enhance the frictional engagement of the filter cloth with the roller a suction means may be provided for sucking the cloth against the roller. Conveniently, the suction means may also comprise a plurality of longitudinally extending spaced-apart passages in the roller each in communication with a different segment of the cylindrical surface of the roller via suitable bores and a valve means for coupling to a suction source those passages which are in communication with that portion of the cylindrical surface engaged by the filter cloth. As with the discharge fluid channelling passages, these suction passages may be open at one end and the valve means may comprise a stationary end valve with which the suction passages are alternately aligned upon rotation of the roller. A plurality of suction channels may also be provided in the cylindrical surface of the roller, which are in communication with the suction bores. Preferably the roller is driven. The roller is then preferably driven at a constant torque.

The invention extends still further to a vacuum belt filter which includes the residue cake discharge assisting means of the invention.

The discharge fluid may be water or air. It may further include cleaning additives for cleaning the filter cloth.

DESCRIPTION OF PREFERRED EMBODIMENTS

The invention is now described by way of examples, with reference to the accompanying drawings, in which:

FIG. 1 being a view along line I—I;

FIG. 5 being a view along line V—V in FIG. 6;

Figure 1:
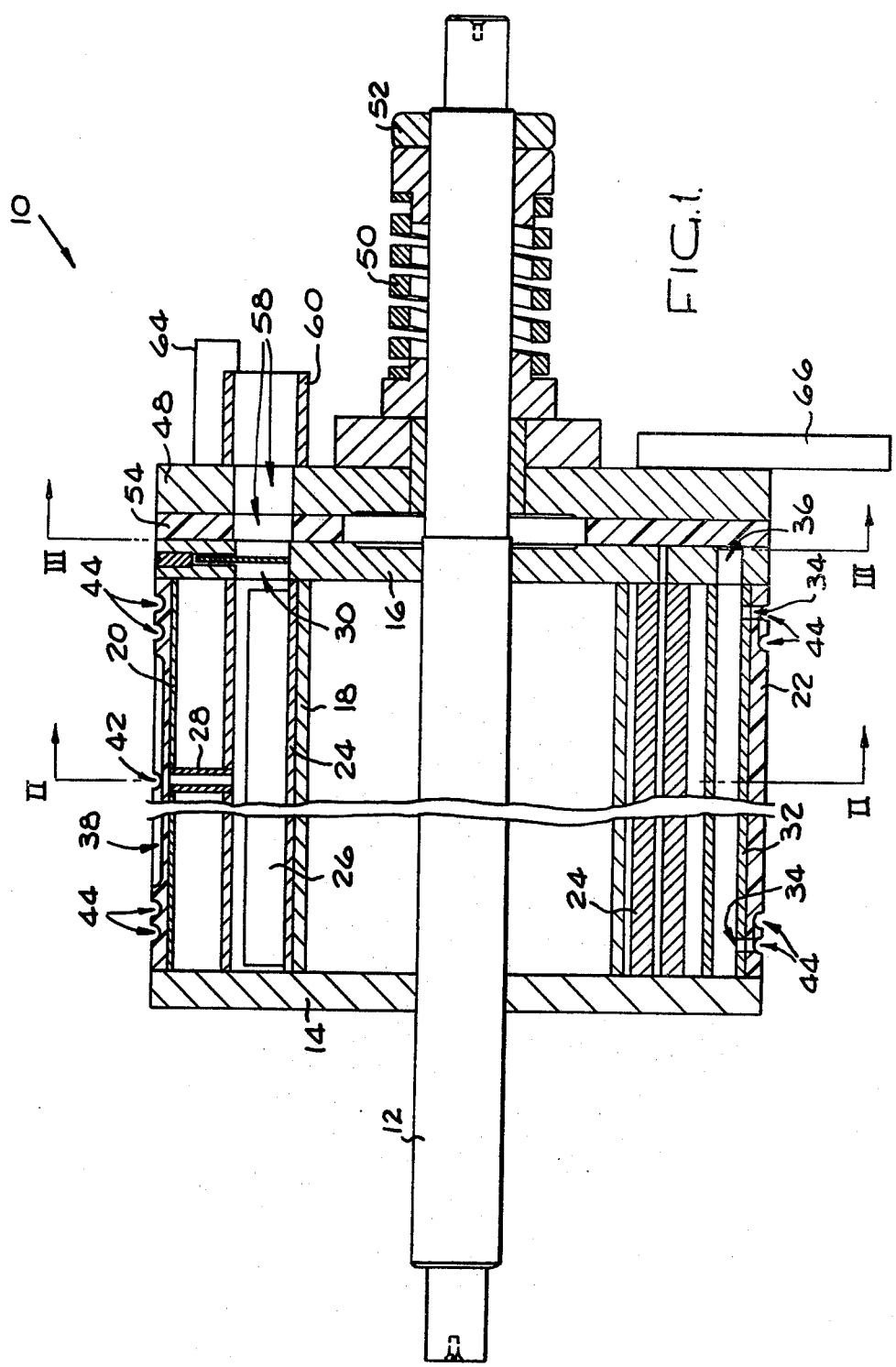
FIG. 1 shows an axial sectional view of a residue cake discharge roller in accordance with the invention.
Figure 2:
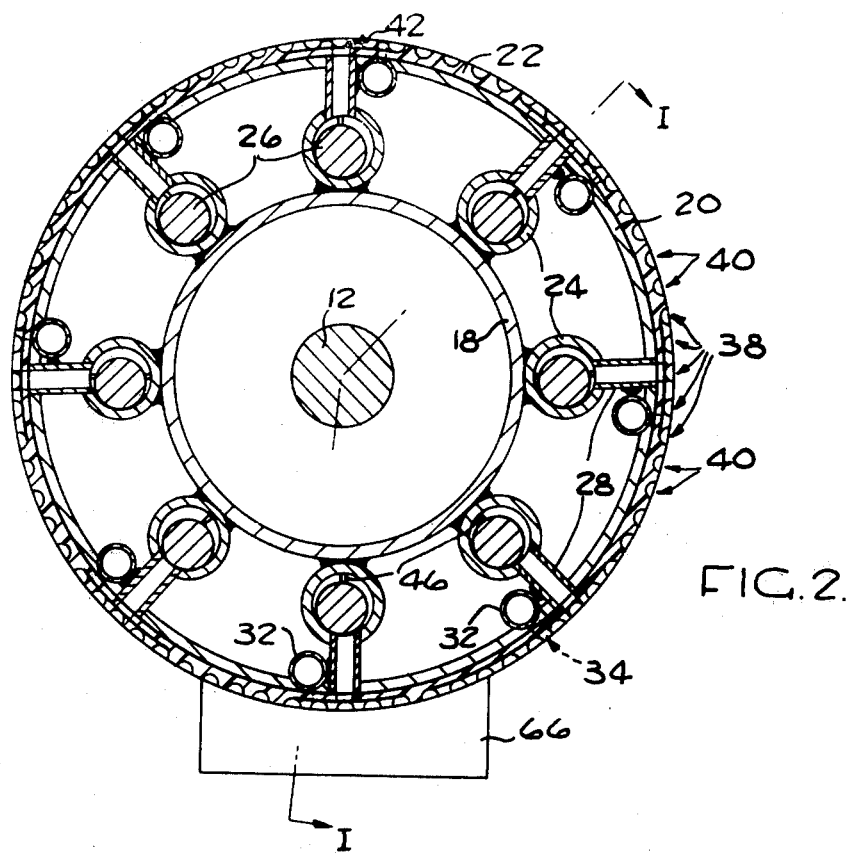
FIG. 2 shows a transverse sectional view of the roller of FIG. 1 along line II—II in FIG. 1.
Figure 3:
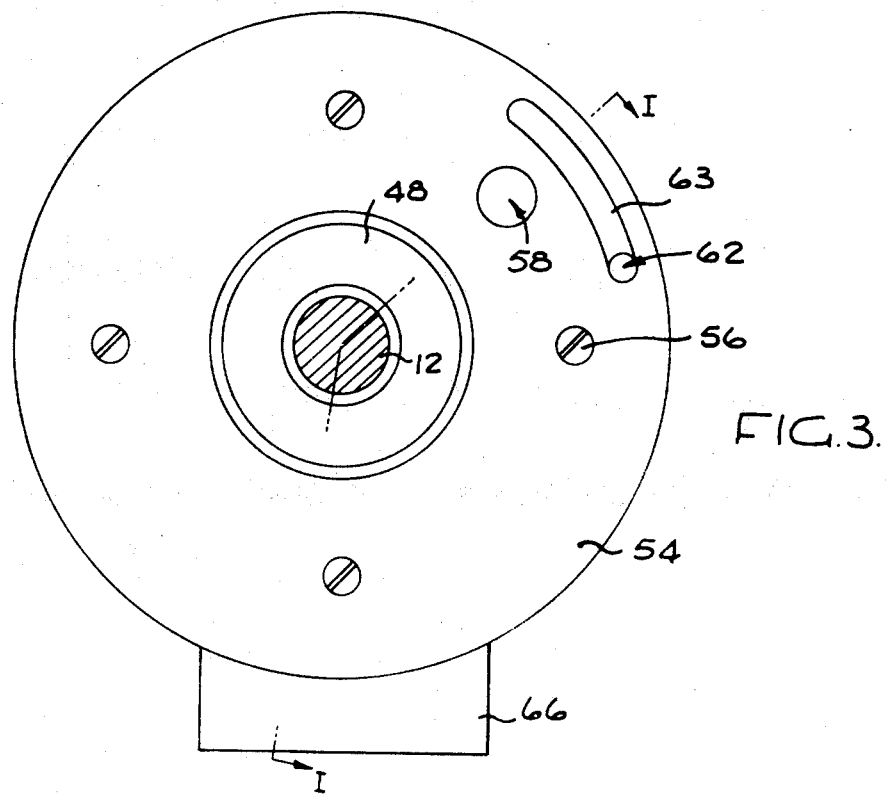
FIG. 3 shows a further transverse sectional view of the roller of FIG. 1 along line III—III therein, FIG. 1 again being a view along line I—I in FIG. 3.
Figure 4:
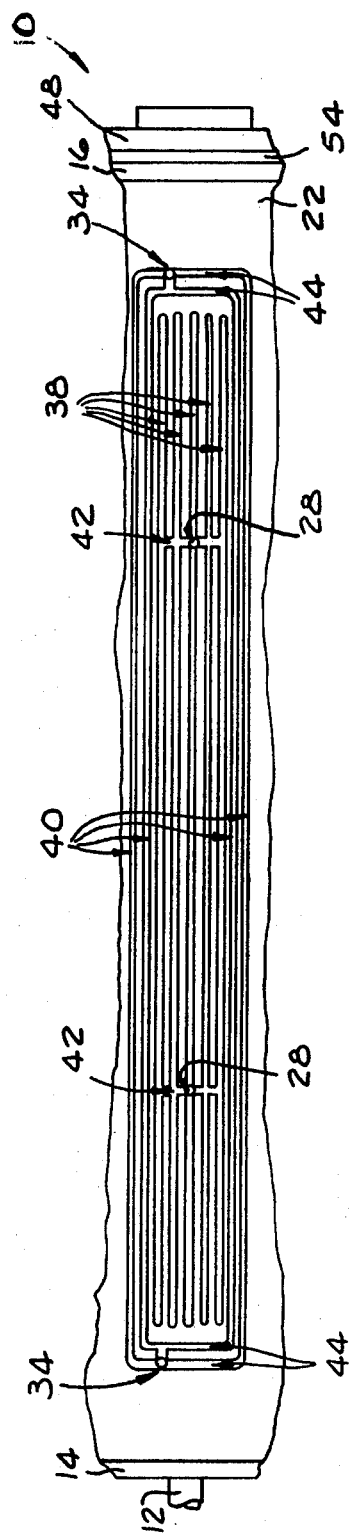
FIG. 4 is a side view of the roller shown in FIGS. 1 to 3, which shows a segment of the cylindrical surface of the roller.

Referring now to FIGS. 1 to 4, a first embodiment of a cake discharge roller is indicated therein, referred to generally by reference numeral 10. The roller 10 has a circular cylindrical transverse sectional profile, and is mountable to be freely rotatable by means of a shaft 12. Fast with the shaft and rotatable therewith are two end walls 14 and 16 to which are secured an inner cylindrical member 18 and an outer cylindrical member 20. Secured to the outer surface of the outer cylindrical member 20 is a rubber lining 22. Within the roller 10, there are eight longitudinally extending tubes 24 which are secured to the outer surface of the inner cylindrical member 18. The tubes 24 are circumferentially spaced-apart every 45 degrees. Within the tubes 24 are filler rods 26. The tubes 24 are in communication with the outer surface of the roller 10 by means of pipes 28. Apertures 30 are provided in the end wall 16 in register with the tubes 24. The roller 10 contains a further set of eight tubes 32, which are secured to the inner surface of the outer cylindrical member 20. These tubes 32 are also longitudinally directed and circumferentially spaced-apart as with the tubes 24. Bores 34 are provided in the outer lining 22, the outer cylindrical member 20 and the tubes 32, wherethrough the tubes communicate with the outer surface of the roller 10. A further set of apertures 36 is provided in the end wall 16, in register with the tubes 32. The outer cylindrical surface of the roller 10 is divided into eight segments, a segment for each tube 24 and its associated tube 32. Each segment is provided with two sets of longitudinally extending channels in the outer surface of the rubber lining 22. The first set comprises of five channels 38 and the second set comprises of four channels 40. There are two channels 40 on either side of the set of channels 38. The longitudinal channels 38 are connected by means of arcuate channels 42 and the other longitudinal channels 40 are connected by means of arcuate channels 44. As indicated in FIG. 4, the pipes 28 open in the arcuate channels 42 and the bores 34 open in the arcuate channels 44. Thus, the longitudinal channels 38 are in communication with the tubes 24 and the longitudinal channels 40 are in communication with the tubes 32. A pin 46 is provided in the end wall 16, for each aperture 30, to retain the rods 26 within the tubes 24.

The roller 10 further has a stationary end plate 48 which is biassed against the end wall 16 by means of a spring 50 which engages a collar 52 on the shaft 12. An annular sealing member 54 is provided between the end plate 48 and the end wall 16. This sealing member 54 is of a suitable synthetic plastics material having a low co-efficient of friction. Further, the sealing member 54 is secured to the end plate 48 by means of bolts 56, as indicated in FIG. 3. The end plate 48 and the sealing member 54 have corresponding apertures 58 situated at a suitable radial position such that the apertures 30 in the end wall 16 may be brought into register therewith upon rotation of the end wall 16. A connecting pipe 60 is provided fast with the end wall 16 about the aperture 58 therein. A further aperture 62 is provided in the end plate 48 which communicates with an arcuate slot 63 in the sealing member 54. The apertures 36 in the end wall 16 are brought into register with the slot 63 upon rotation of the end wall 16. A further connecting pipe 64 is provided, fast with the end plate 48 about this aperture 62. Finally, a retaining member 66 is provided, fast with the end plate 48.

Figure 8:
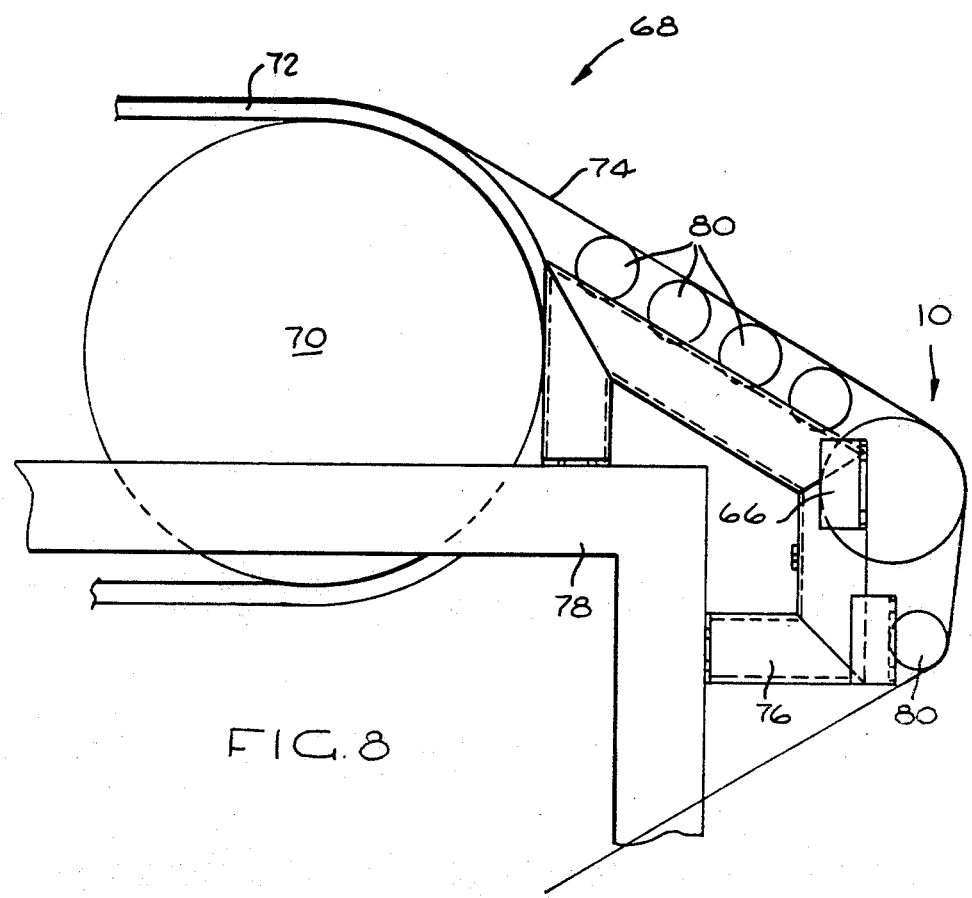
FIG. 8 shows schematically a head potion of a horizontal vacuum belt filter, indicating the position of the roller of either FIGS. 1 to 4 or 5 to 7.

Referring now to FIG. 8, the head portion of a horizontal vacuum belt filter is shown generally by reference numeral 68. Shown therein is a head roller 70 about which passes a support belt 72 of the filter, upon which is supported a filter cloth 74. Spaced away from the head roller 70, the discharge roller 10 is rotatably supported. An auxiliary mounting frame 76 is provided which is secured to a framework structure 78 of the filter. The discharge roller 10 is freely rotatably secured to this mounting frame 76. A number of intermediate support rollers 80 are provided for supporting the cloth 74. The roller is such that the connecting pipes 60 and 64 are in communication with that portion of the cylindrical surface of the roller 10 engaged by the cloth 74, via the apertures 58, the appropriate aperture 30, tube 24 and pipe 28; and the aperture 62, the slot 63, and the appropriate aperture 36, tube 32 and bores 34, respectively.

In use, the connecting pipe 60 is connected to a source of water and the connecting pipe 64 is connected to a suction source. As the belt 72 is displaced, the cloth 74 is displaced therewith thereby causing the roller 10 to rotate. As the channels 40 and 44 in that portion of the cylindrical surface of the roller 10 which is engaged by the cloth 74 are in communication with the suction source, there is a suction pressure in these channels 40 and 44 which enhances the frictional engagement of the cloth 74 with the roller 10. Further, the channels 38 and 42 of this portion of the cylindrical surface that is engaged by the filter cloth 74 is in communication with the water source as explained above. As a result, water is forced through the filter cloth in a reverse direction, thereby dislodging any filtered cake present on that portion of the cloth 74. As the cloth 74 travels further, to assume a more vertical attitude, the so dislodged filter cake slides off the cloth 74. It will be appreciated, that as the cloth 74 is displaced, the roller 10 is caused to rotate and successive segments of the cylindrical surface are brought into engagement with the cloth 74, successive tubes 24 and 32 being brought into communication with the water source and the suction source respectively. The rods 26 minimise the volume of water contained in the tubes 24 and thereby minimise the amount of spillage which occurs as the roller 10 is rotated. Suitable cleaning substances may be included in the water.

Figure 5:
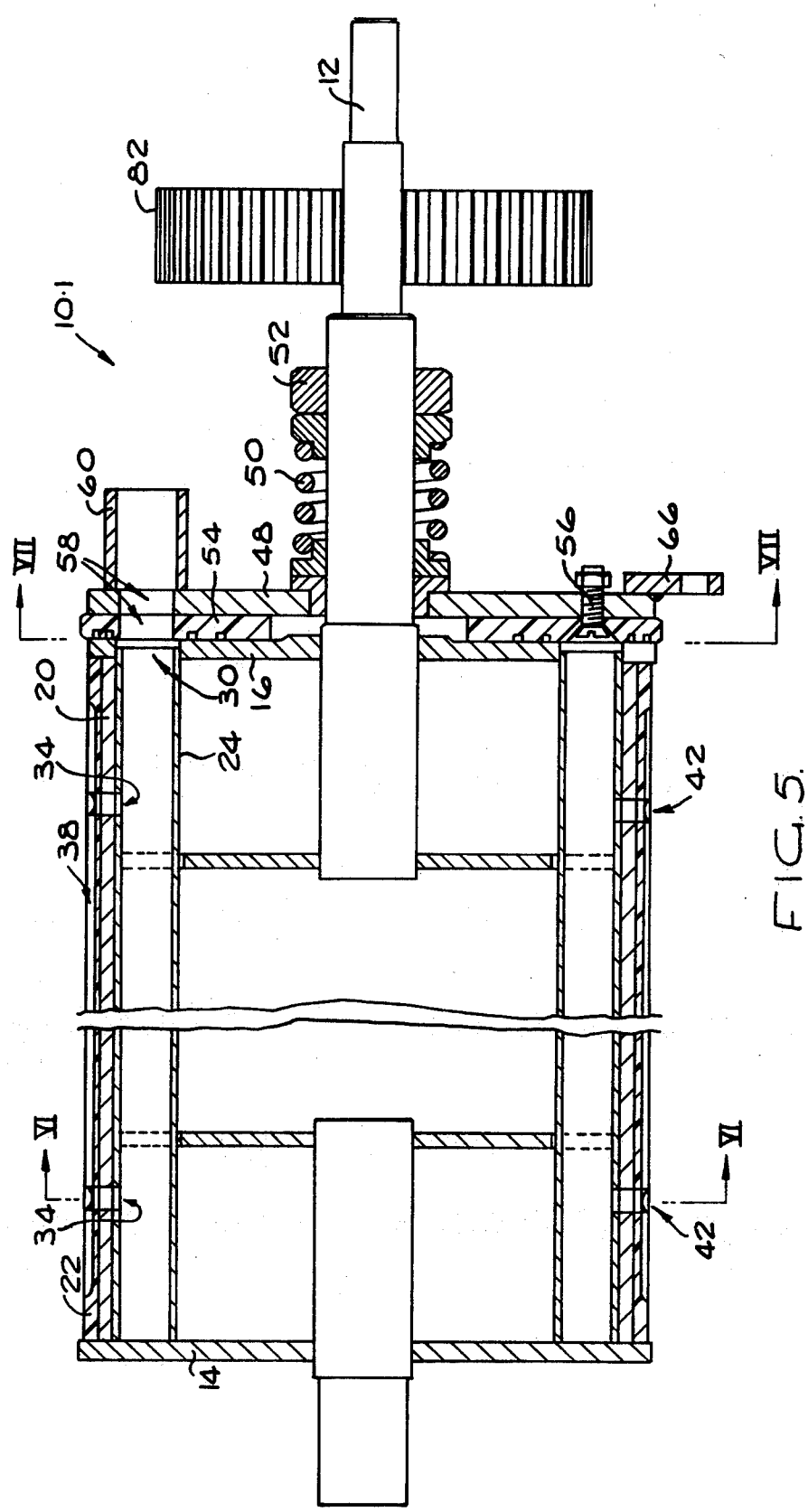
FIG. 5 shows an axial view of a further embodiment of a residue cake discharge roller in accordance with the invention.
Figure 6:
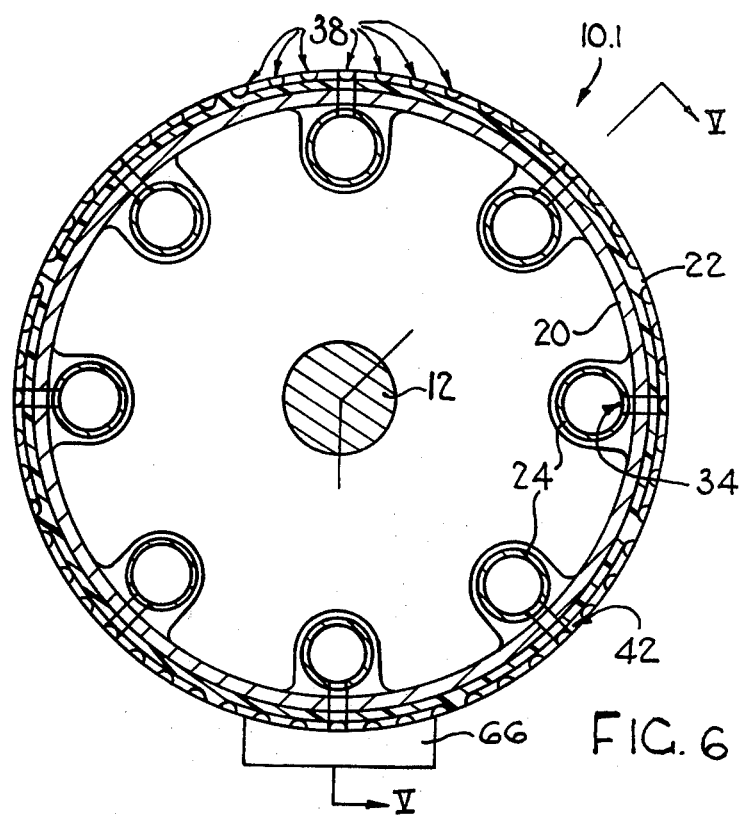
FIG. 6 shows a transverse sectional view of the roller of FIG. 5, along line VI—VI in FIG. 5.
Figure 7:
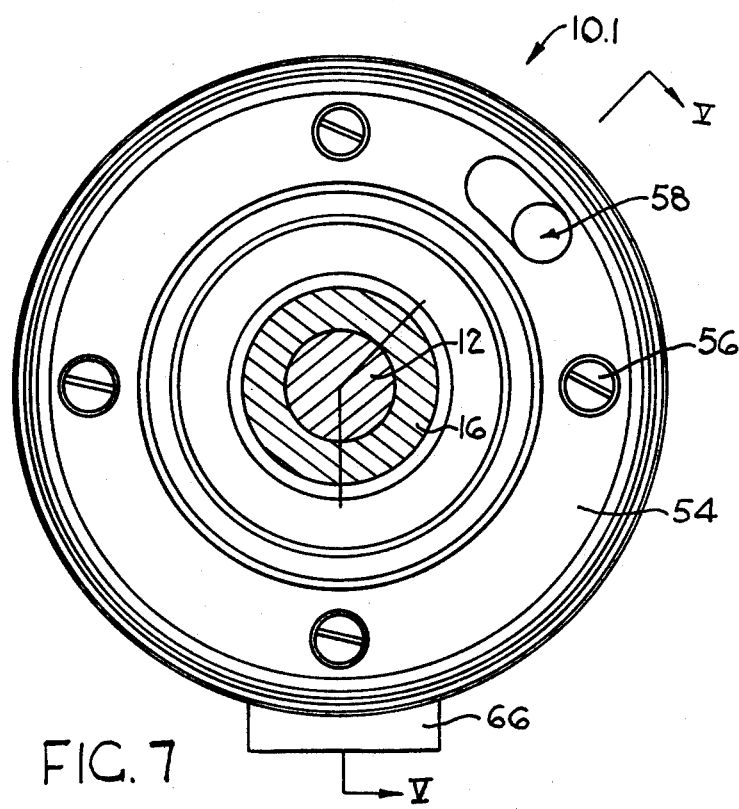
FIG. 7 shows a further transverse sectional view of the roller of FIG. 5 along line VII—VII in FIG. 5, FIG. 5 again being a view along line V—V in FIG. 7.

Referring now to FIGS. 5, 6 and 7, an alternative embodiment of a roller 10.1 is shown therein. This roller 10.1 is similar to the roller 10 of FIGS. 1 to 4 and is similarly referenced. However, whereas the roller 10 is freely rotatable and is rotated by engagement with the filter cloth 74, this roller 10.1 is driven from a constant torque drive by means of a gear wheel 82 which is fast with the shaft 12. Further, as the filter cloth 74 is kept in adequate contact with the cylindrical surface of the roller 10 due to the roller 10 being driven, it is not necessary to suck the filter cloth 74 against the cylindrical surface of the roller 10. Thus, the roller 10.1 is somewhat simpler in construction than the roller 10. The operation of this roller 10.1 is similar to that of the roller 10 and will not be discussed in further detail.

I claim:
1. A horizontal vacuum belt filter which includes an endless filter cloth on which a residue filter cake is, in use, formed:
a filter head roller; and
a rotatable discharge roller located some distance forward of the head roller, a portion of the filter cloth passing over a segment of the cylindrical surface of the discharge roller and being in engagement therewith, and the discharge roller having a channelling means for channelling a discharge liquid through the said portion of the filter cloth that is in engagement with the discharge roller, in a reverse direction through the cloth, thereby to separate the residue cake from the cloth.

2. A vacuum belt filter as claimed in claim 1, in which the channelling means comprises
a plurality of longitudinally directed and circumferentially spaced-apart passages in the discharge roller which are each in communication with a different segment of the cylindrical surface of the discharge roller via suitable bores; and
a valve means for directing discharge liquid to those passages which are in communication, at any particular time, with that segment of the cylindrical surface engaged by the filter cloth.

3. A vacuum belt filter as claimed in claim 2, in which the passages are open at one end and the valve means comprises a stationary end valve with which the passages are alternately aligned upon rotation of the discharge roller.

4. A vacuum belt filter as claimed in claim 2, in which the discharge roller has a plurality of distribution channels in its cylindrical surface, which are in communication with the bores.

5. A vacuum belt filter as claimed in claim 1, which includes a discharge liquid supplying means for supplying pressurized discharge liquid to the channelling means.

6. A vacuum belt filter as claimed in claim 1, in which the discharge liquid is water.

7. A vacuum belt filter as claimed in claim 1, which includes a suction means for sucking the cloth against the discharge roller.

8. A vacuum belt filter as claimed in claim 7, in which the suction means comprises a plurality of longitudinally extending, circumferentially spaced-apart suction passages in the discharge roller each in communication with a different segment of the cylindrical surface of the discharge roller via a suitable bore; and a valve means for coupling to a suction source those passages which are in communication, at any particular time, with that segment of the cylindrical surface engaged by the filter cloth.

9. A vacuum belt filter as claimed in claim 8, in which the suction passages are open at one end and the valve means comprises a stationary end valve with which the suction passages are alternately aligned upon rotation of the discharge roller.

10. A vacuum belt filter as claimed in claim 9, in which the discharge roller has a plurality of suction channels in its cylindrical surface, which are in communicaton with the bores.

11. A vacuum belt filter as claimed in claim 1, which includes a drive means for rotatably driving the roller.

12. A vacuum belt filter as claimed in claim 11, in which the filter cloth is not tensioned along its return path between the discharge roller and the feed end of the filter.

13. A vacuum belt filter as claimed in claim 1, in which the filter cloth is tensioned thereby to hold the cloth in engagement with the discharge roller.

14. A vacuum belt filter as claimed in claim 1, which has a series of supporting rollers being provided intermediate the discharge and head rollers for supporting the filter cloth.

15. A method of discharging a residue cake from a filter cloth of a horizontal vacuum belt filter, which includes passing a portion of the filter cloth over a segment of the cylindrical surface of a rotatable discharge roller; and causing a discharge liquid to flow in a reverse direction through the said portion of the filter cloth in engagement with the segment of the roller, via the roller, thereby to separate the residue cake from the filter cloth.

16. A method as claimed in claim 15, in which the discharge roller is driven at a constant torque.

17. A method as claimed in claim 15, which includes adding cleaning additives to the discharge fluid for cleaning the filter cloth.

18. A method as claimed in claim 15, which includes maintaining the filter cloth in engagement with the discharge roller by suction.

19. A method as claimed in claim 15, which includes passing the discharge liquid into a passage within the roller and then through communicating bores between the passage and the cylindrical surface of the roller, thereby causing the discharge liquid to flow through the filter cloth in a reverse direction.

* * * * *